United States Patent
Isa et al.

(10) Patent No.: US 9,223,035 B2
(45) Date of Patent: Dec. 29, 2015

(54) RADIOGRAPHIC IMAGE DETECTOR

(71) Applicant: Konica Minolta, Inc., Tokyo (JP)

(72) Inventors: Hiroshi Isa, Akishima (JP); Masashi Kondo, Hachioji (JP); Mitsuko Miyazaki, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 2 days.

(21) Appl. No.: 14/331,657

(22) Filed: Jul. 15, 2014

(65) Prior Publication Data
US 2015/0021484 A1   Jan. 22, 2015

(30) Foreign Application Priority Data

Jul. 22, 2013  (JP) ................................. 2013-151492

(51) Int. Cl.
  *G01T 1/20*    (2006.01)
  *G01T 1/202*   (2006.01)
(52) U.S. Cl.
  CPC . *G01T 1/202* (2013.01); *G01T 1/20* (2013.01); *G01T 1/2018* (2013.01)
(58) Field of Classification Search
  CPC .......... G01T 1/202; G01T 1/2018; G01T 1/20
  USPC ............. 250/361 R, 367, 458.1, 483.1, 484.4
  See application file for complete search history.

(56) References Cited

U.S. PATENT DOCUMENTS

| | | | |
|---|---|---|---|
| 2010/0163735 A1* | 7/2010 | Menge ............... | C09K 11/7704 250/361 R |
| 2013/0068953 A1* | 3/2013 | Itaya ................... | A61B 6/4208 250/368 |

FOREIGN PATENT DOCUMENTS

| | | |
|---|---|---|
| JP | 2001-059899 | 3/2001 |
| JP | 2012-047487 A | 3/2012 |
| WO | WO 2008108428 A1 | 9/2008 |

* cited by examiner

*Primary Examiner* — Yara B Green
(74) *Attorney, Agent, or Firm* — Lucas & Mercanti, LLP

(57) ABSTRACT

The invention provides radiographic image detectors in which a scintillator layer itself exhibits improved flexibility and is prevented from crystal breakage while the scintillator layer and a photoelectric conversion element are bonded to each other via uniform thickness without forming defects.
The radiographic image detector includes a substrate, a scintillator layer with a columnar crystal structure disposed on the substrate, an optical coupling layer and a photoelectric conversion element. The scintillator layer has a flexural elastic modulus Esc satisfying relationships represented by Expression (I) as measured by a cantilever test in which the scintillator layer disposed on the substrate is held in a cantilever condition and is bent under a uniformly distributed load with the columnar crystal structure side being bent outward:

$Esc \leq -0.43M+372$ and $Esc \geq -0.16M+98$   (I)

(In Expression (I), Esc is the flexural elastic modulus (kg/mm$^2$) of the scintillator layer and M is the thickness (μm) of the scintillator layer).

13 Claims, 5 Drawing Sheets

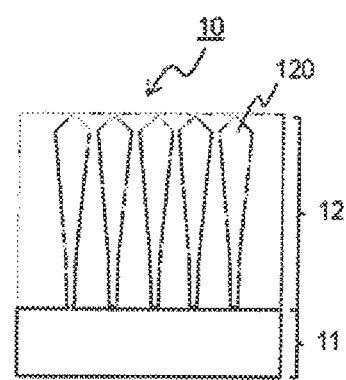
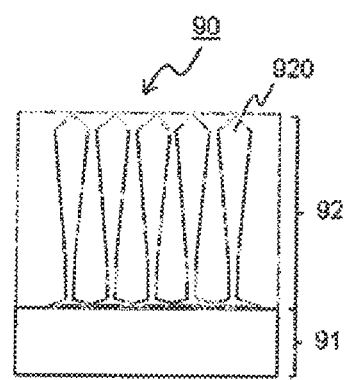
Fig. 1A
Fig. 1B

CANTILEVER (UNDER UNIFORMLY DISTRIBUTED LOAD)

RADIOGRAPHIC IMAGE DETECTOR

CROSS REFERENCE TO RELATED APPLICATION

This Application claims the priority of Japanese Patent Application No. 2013-151492 filed on Jul. 22, 2013, which is incorporated by reference herein.

BACKGROUND OF THE INVENTION

1. Field of the Invention

The present invention relates to radiographic image detectors having a scintillator layer with improved flexibility.

2. Description of the Related Art

In a conventional radiographic image detector, an optical coupling layer is disposed between a scintillator panel which converts radiations into light, and a photoelectric conversion element to prevent the scattering of light. Materials such as pressure sensitive adhesives, liquid resin adhesives and optical oils are used as the optical coupling layers. However, the use of these materials in the bonding of a scintillator panel and a photoelectric conversion element encounters problems described below. In the case of pressure sensitive adhesives, a gap is caused due to the thickness distribution in the scintillator layer or the irregularities present on the photoelectric conversion element, resulting in the occurrence of a bonding failure and consequent problems such as separation charging and image defects. In the case of liquid resin adhesives and optical oils, the thickness of the resin or the oil becomes nonuniform due to the thickness distribution in the scintillator layer or the irregularities on the photoelectric conversion element, resulting in a failure to achieve in-plane uniformity of image quality. In particular, these problems are more pronounced when the scintillator layer has a large thickness distribution or when a plurality of photoelectric conversion element panels are combined.

To solve the aforementioned problems, a polymer film is used as a substrate for a scintillator layer (see, for example, Patent Literature 1). Because polymer films have flexibility, the use of a polymer film as a substrate makes it possible that the substrate and the scintillator layer can be deformed in conformity with the shape of the light-receiving surface of a light-receiving element. According to Patent Literature 1, the distance between a scintillator layer and a light-receiving surface is rendered uniform by causing the deformation of the substrate and the scintillator layer constituting a radiation flat panel detector, thereby improving the resolution associated with radiation detection.

In this radiation flat panel detector, however, the scintillator layer which is poor in flexibility can incur problems such as separation or crystal breakage in the case where the scintillator layer has large thickness distribution or significant geometric changes on the side adjacent to the light-receiving surface.

To solve the above problems, a columnar crystal scintillator layer is formed on a flexible substrate and a moistureproof protective layer (polyparaxylylene) is formed to cover the scintillator layer and to fill between the columnar crystals, thereby preventing the breakage of the crystals (see, for example, Patent Literature 2).

However, the placement of a moistureproof protective layer between the columnar crystals does not improve the flexibility of the scintillator layer itself and thus is not a fundamental solution.

CITATION LIST

Patent Literature

Patent Literature 1: Japanese Patent No. 4983911
Patent Literature 2: JP-A-2012-47487

SUMMARY OF THE INVENTION

An object of the invention is to provide radiographic image detectors in which a scintillator layer itself exhibits improved flexibility and is prevented from crystal breakage while the scintillator layer and a photoelectric conversion element are bonded to each other via uniform thickness without forming defects.

In order to improve the flexibility of a scintillator layer, it is necessary that the independency of columnar phosphor crystals be enhanced. If columnar crystals are fusion bonded together, the scintillator layer will not show flexibility higher than the elastic modulus of the materials constituting the scintillator layer. In contrast, independent columnar crystals are capable of deformation without incurring crystal breakage.

The present inventors have found that the independency of columnar crystals may be enhanced to allow a scintillator layer to achieve improved flexibility and to be prevented from crystal breakage and also that the scintillator layer and a photoelectric conversion element may be bonded to each other via uniform thickness without forming defects according to the configurations described below.

That is, the present invention has the following configurations.

A radiographic image detector according to the invention includes a substrate, a scintillator layer with a columnar crystal structure disposed on the substrate, an optical coupling layer and a photoelectric conversion element, the scintillator layer having a flexural elastic modulus Esc satisfying relationships represented by Expression (I) as measured by a cantilever test in which the scintillator layer disposed on the substrate is held in a cantilever condition and is bent under a uniformly distributed load with the columnar crystal structure side being bent outward:

$$Esc \leq -0.43M + 372 \text{ and } Esc \geq -0.16M + 98 \qquad (I)$$

wherein in Expression (I), Esc is the flexural elastic modulus ($kg/mm^2$) of the scintillator layer and M is the thickness ($\mu m$) of the scintillator layer.

Preferably, the scintillator layer includes an underlayer and a phosphor layer, and the underlayer and the phosphor layer are stacked in this order on the substrate.

Preferably, the scintillator layer is formed from a phosphor raw material having a total impurity content of 2.5 ppm to 35 ppm, the total impurity content being the content of an impurity or impurities, except an activator, having a higher melting point than the phosphor raw material.

Preferably, the phosphor raw material is cesium iodide (CsI) and the impurity or impurities include one or more elements selected from magnesium (Mg), calcium (Ca), strontium (Sr), barium (Ba), aluminum (Al), silicon (Si), nickel (Ni), copper (Cu), iron (Fe), manganese (Mn), chromium (Cr), molybdenum (Mo) and tantalum (Ta).

Preferably, the optical coupling layer includes a thermosetting resin.

Preferably, the optical coupling layer is a hot melt sheet.

Preferably, the optical coupling layer includes a pressure sensitive adhesive material.

According to the present invention, the scintillator layer achieves improved flexibility to make it possible that the scintillator panel and the photoelectric conversion element may be bonded to each other via uniform thickness through the optical coupling layer without trapping bubbles or without causing breakage or defects in the columnar phosphor crystals. Consequently, the inventive radiographic image detector achieves high image quality and high in-plane uniformity of image quality.

In the invention, the scintillator layer may include an underlayer in addition to a phosphor layer. According to this configuration, the independency of individual columnar crystals is further increased and the scintillator panel attains a further improvement in flexibility. Consequently, the scintillator layer may be bonded to the photoelectric conversion element through the optical coupling layer while the thickness of the optical coupling layer may be rendered more uniform than in the absence of the underlayer.

The phosphor raw material used in an embodiment of the invention has a specific total content of impurities, except an activator, having a higher melting point than the phosphor raw material. According to this configuration, the phosphor raw material is applied to the substrate in such a way that the impurities are included inside the phosphor raw material that has been heated. This produces an effect similar to an inert gas. Specifically, the progress of fusion bonding of the columnar phosphor crystals in the direction of the plane of the deposition substrate is limited to a certain degree and consequently the columnar crystals formed achieve high independency.

The radiographic image detectors according to the invention may be suitably applied to scintillators for X-ray detectors having curved sensor units such as C-shaped X-ray line cameras used for high-speed defect inspection or quality control.

BRIEF DESCRIPTION OF THE DRAWINGS

FIG. 1A is a schematic sectional view illustrating a substrate and a scintillator layer constituting a radiographic image conversion panel according to the invention, and FIG. 1B is a schematic sectional view illustrating a substrate and a scintillator layer constituting a conventional radiographic image conversion panel.

DESCRIPTION OF THE PREFERRED EMBODIMENTS

A radiographic image detector according to the invention includes a substrate, a scintillator layer with a columnar crystal structure disposed on the substrate, an optical coupling layer and a photoelectric conversion element.

Hereinbelow, there will be described in detail a structure composed of the substrate and the scintillator layer with a columnar crystal structure disposed on the substrate (hereinafter, written as the "radiographic image conversion panel" or the "scintillator panel"), as well as the optical coupling layer and the photoelectric conversion element.

FIG. 1A illustrates a basic configuration of a radiographic image conversion panel 10 of the invention. As illustrated in FIG. 1A, the radiographic image conversion panel 10 has a structure in which a scintillator layer 12 is composed of a plurality of columnar crystals 120 containing a phosphor and the plurality of columnar crystals 120 have separate and independent root portions adjacent to a substrate 11.

Figure 2:
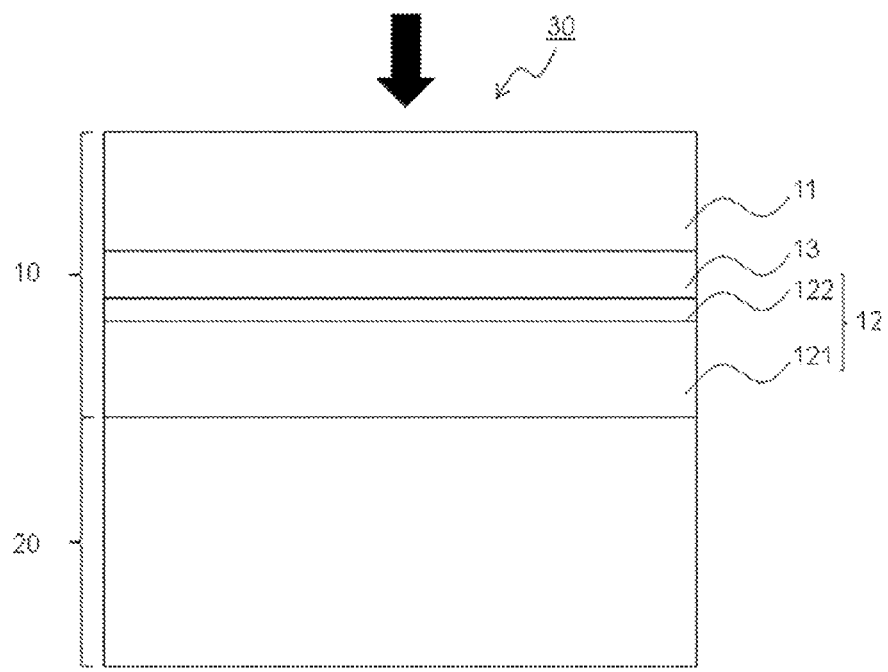
FIG. 2 is a schematic sectional view illustrating a basic configuration of a radiographic image conversion panel.

In a more specific embodiment, as illustrated in FIG. 2, the radiographic image conversion panel 10 may further include an additional layer such as a reflective layer 13 between the substrate 11 and the scintillator layer 12. Such a radiographic image conversion panel 10 may be used as a scintillator panel and, as illustrated in FIG. 2, may be combined with a photoelectric conversion element panel 20 to produce a radiographic image detector 30 which can output image data in the form of electric signals.

Hereinbelow, the structural components will be sequentially described.

Substrates

In the radiographic image conversion panel 10 of the invention, the substrate 11 serves as a base on which the columnar crystals 120 as the scintillator layer 12 are formed, and also holds the structure of the scintillator layer 12.

Examples of the materials for the substrates 11 include various glasses, ceramics, semiconductors, polymer materials and metals which are transmissive to radiations such as X-rays. Specific examples of such materials include plate glasses such as quartz, borosilicate glass and chemically reinforced glass; ceramics such as sapphire, silicon nitride and silicon carbide; semiconductors such as silicon, germanium, gallium arsenide, gallium phosphide and gallium nitride; polymer films (plastic films) such as cellulose acetate films, polyester resin films, polyethylene terephthalate films, polyamide films, polyimide films, triacetate films, polycarbonate films and carbon fiber-reinforced resin sheets; bio-nanofiber films; and metal sheets such as aluminum sheets, iron sheets and copper sheets, as well as metal sheets having layers of oxides of these metals. These materials may be used singly, or two or more may be stacked together.

Of the materials for the substrates 11, polymer films are preferable, and flexible polymer films having a thickness of 50 to 500 μm are more preferable. In particular, polyimide films are highly preferable from the viewpoint of heat resistance during deposition. Commercially available products, for example, UPILEX-1255 (manufactured by UBE INDUSTRIES, INC.) may be used.

Here, the term "flexible" means that the elastic modulus at 120° C. (E120) is 0.1 to 300 GPa. The "elastic modulus" is a value obtained by testing a JIS-C2318 sample with a tensile tester, and calculating the ratio of the stress over the strain indicated by the gauge marks on the sample, in the range in which the strain stress curve shows a straight relationship. This ratio is called the Young's modulus. In the specification, this Young's modulus is defined as the elastic modulus.

The substrate 11 usually has an elastic modulus at 120° C. (E120) of 0.1 to 300 GPa, and preferably 1 to 100 GPa.

Specific examples of the flexible polymer films include polyethylene naphthalates (6 to 8 GPa), polyethylene terephthalates (3 to 5 GPa), polycarbonates (1 to 3 GPa), polyimides (6 to 8 GPa), polyetherimides (2 to 4 GPa), aramids (11 to 13 GPa), polysulfones (1 to 3 GPa) and polyether sulfones (1 to 3 GPa). (The numbers in parenthesis indicate elastic moduli.) The values of elastic modulus are variable even in polymer films of the same kind, and the values in parenthesis are not absolutely correct and should be considered as a guide. The above polymer materials are advantageous in that the materials have high heat resistance and can withstand deposition of phosphor. In particular, polyimides possess especially high heat resistance and are suitable in the case where the columnar crystals of phosphor (scintillator) are formed by a gas-phase method using cesium iodide (CsI) as the raw material.

The flexible polymer film may be a single polymer film, a film of a mixture of the above polymers, or a stack of two or more identical or different polymer layers.

The use of a bio-nanofiber film as the substrate 11 provides benefits in terms of substrate characteristics and environmental friendliness because the bio-nanofiber films have characteristics which are not possessed by existing glasses or plastics such as (i) low weight, (ii) strength five times or more greater than iron (high strength), (iii) resistance to swelling by heat (low thermal expansion properties), (iv) being flexible (excellent flexibility), (v) feasibility of various treatments such as mixing, coating and film production, and (vi) combustibility of plant fiber materials.

In order to, for example, adjust the reflectance of the substrate 11, the substrate 11 may include a light-shielding layer and/or a light-absorbing pigment layer in addition to the layer of the aforementioned material. Further, the substrate itself may be imparted with light-shielding properties or light-reflecting properties, or may be composed of any of the aforementioned materials that has been colored.

The light-shielding layer and the pigment layer may be provided as separate films. This configuration will be described later in the section of "Additional layers".

Examples of the substrates having light-shielding properties or light-reflecting properties include various metal plates and amorphous carbon plates. When the metal plates are used as the substrates, aluminum plates having a thickness of 0.2 mm to 2.0 mm are preferable from the viewpoints of X-ray transmission properties and handling properties.

Examples of the colored substrates include films containing pigments or other coloring materials (more preferably, pigments), and substrates having a reflective layer formed thereon by dispersing a pigment or other coloring material (more preferably, a pigment) in a binder resin. The use of such colored substrates is preferable from the viewpoint of the adjustment of reflectance of the substrates.

The binder resins are not particularly limited as long as the object of the invention is achieved. The binder resins may be purchased in the market or may be produced appropriately. Specific examples include vinyl chloride copolymers such as vinyl chloride-vinyl acetate copolymer, vinyl chloride-vinylidene chloride copolymer and vinyl chloride-acrylonitrile copolymer; synthetic rubber resins such as acrylonitrile-butadiene copolymer and butadiene-styrene copolymer; acrylic resins, polyester resins, polyamide resins, polyurethane resins, polyvinylbutyrals, cellulose derivatives (such as nitrocellulose), silicon resins, fluororesins; and thermosetting resins such as phenolic resins, epoxy resins, urea resins, melamine resins, phenoxy resins and urea-formamide resins. Of these, hydrophobic resins such as polyester resins and polyurethane resins are preferable because of excellent interlayer adherability with respect to the columnar phosphor crystals formed by deposition and to the substrate.

Examples of the pigments include insoluble azo pigments such as First Yellow, Disazo Yellow, Pyrazolone Orange, Lake Red 4R and Naphthol Red;

condensed azo pigments such as Cromophtal Yellow and Cromophtal Red;

azo lake pigments such as Lithol Red, Lake Red C, Watching Red, Brilliant Carmine 6B and Bordeaux 10B;

nitroso pigments such as Naphthol Green B;

nitro pigments such as Naphthol Yellow S;

phthalocyanine pigments such as Phthalocyanine Blue, First Sky Blue and Phthalocyanine Green;

threne pigments such as Anthrapyrimidine Yellow, Perinone Orange, Perylene Red, Thioindigo Red and Indanthrone Blue;

quinacridone pigments such as Quinacridone Red and Quinacridone Violet;

dioxadine pigments such as Dioxadine Violet;

isoindolinone pigments such as Isoindolinone Yellow;

acidic dye lakes such as Peacock Blue Lake and Alkali Blue Lake; and basic dye lakes such as Rhodamine Lake, Methyl Violet Lake and Malachite Green Lake.

The pigments are preferably used in amounts of 0.01 to 10 parts by weight with respect to 100 parts by weight of the binder resin. This amount of the pigments ensures sufficient coloring of the films and prevents deteriorations in mechanical properties such as elongation and strength of the substrate resin due to excessive addition of the pigments over the saturated coloration.

Scintillator Layers

In the radiographic image conversion panel 10 of the invention, the scintillator layer serves to convert the energy of incident radiations such as X-rays into visible light.

The phosphor raw materials for forming the scintillator layer are not particularly limited as long as the materials are capable of efficient conversion of the energy of incident radiations such as X-rays into light as well as can form columnar crystals. As long as these conditions are satisfied, any of various known phosphors may be used as the phosphor raw materials. In particular, suitable materials include cesium iodide (CsI), gadolinium oxysulfide (GOS), cadmium tungstate (CWO), gadolinium silicate (GSO), bismuth germanate (BGO), lutetium silicate (LSO) and lead tungstate (PWO). The phosphor raw materials used in the invention are not limited to instantaneous or direct-emission phosphors such as CsI, and stimulable phosphors such as cesium bromide (CsBr) may be used in accordance with the application of radiographic image conversion panels.

Of the phosphor raw materials used in the invention, CsI is preferable because this phosphor raw material has relatively high X-ray to visible light conversion efficiency and also because cesium iodide is easily deposited to form columnar crystals and provides light guide effects ascribed to the crystal structure to suppress the scattering of emitted light in the crystals and to allow the thickness of the phosphor layer to be increased corresponding to the amount of suppressed scattering.

Cesium iodide alone as the phosphor raw material often fails to realize sufficient luminous efficiency. Although this fact does not eliminate the use of CsI alone as the phosphor raw material, it is preferable that the scintillator layer include CsI as the phosphor base material in combination with any of various activators. Examples of such scintillator layers include a scintillator layer disclosed in JP-B-S54-35060 which contains CsI and sodium iodide (NaI) in an appropriate molar ratio. Further, an example of such scintillator layers is one disclosed in JP-A-2001-59899 which contains CsI and activators containing such elements as thallium (Tl), europium (Eu), indium (In), lithium (Li), potassium (K), rubidium (Rb) and sodium (Na), in an appropriate molar ratio.

In the radiographic image conversion panel 10 of the invention, it is particularly preferable that the scintillator layer include, as the raw materials, CsI and an activator(s) including one or more thallium compounds.

Various thallium compounds (thallium (I) compounds and thallium (III) compounds) may be used, with examples including thallium iodide (TlI), thallium bromide (TlBr), thallium chloride (TlCl) and thallium fluoride (TlF and $TlF_3$). In particular, thallium iodide (TlI) is preferable because of excellent activation of CsI.

In the invention, thallium-activated cesium iodide (CsI:Tl) is preferable because this material has a wide emission wavelength range from 300 nm to 750 nm.

In the scintillator layer, the relative content of the activators is preferably 0.1 to 5 mol % relative to 100 mol % of the phosphor base material.

The melting point of the activators is usually in the range of 300 to 800° C., and preferably 400 to 700° C. The melting point of the thallium compounds is preferably in the range of 400 to 700° C. This melting point of the thallium compounds at normal pressure (approximately 0.101 MPa) ensures that the activator is uniformly distributed in the columnar crystals in the scintillator layer formed by deposition, resulting in an improvement in luminous efficiency.

The coefficient of variation in the crystal diameter of the columnar phosphor crystals is usually not more than 50%, preferably not more than 20%, and more preferably not more than 10%.

It is preferable that the crystal diameters of the columnar phosphor crystals constituting the scintillator layer 12 satisfy the relationship $1 \leq (b/a) \leq 3$, and more preferably $1 \leq (b/a) \leq 2$ wherein the letter a is the average crystal diameter of the columnar crystals at a height of 1 μm, and the letter b is the average crystal diameter of the columnar crystals at a height of 3 μm, both heights being values from the side adjacent to the substrate 11. When the value of (b/a) is 3 or less, the columnar crystals are prevented from deformation due to excessive local stress concentration when a pressure is applied in the direction of the thickness of the radiographic image conversion panel, and thus the strength of the scintillator layer is advantageously ensured. On the other hand, controlling the (b/a) ratio to 1 or more is generally easy in production steps.

From the viewpoint of the strength against a pressure in the direction of the thickness of the radiographic image conversion panel, it is more preferable that the (b/a) ratio be in the above range and the average crystal diameter b be not more than 3 μm. When this condition is met, some strength may be obtained even when the scintillator layer 12 has no underlayer 122. However, the addition of an underlayer 122 to a phosphor layer 121 ensures an excellent total balance among strength, sharpness and brightness.

To ensure sharpness, the columnar crystals constituting the scintillator layer 12 usually have an average crystal diameter c of not more than 10 μm, and preferably not more than 8 μm as measured with respect to an uppermost portion of the scintillator layer.

In the invention, the term "average crystal diameter" indicates an average circular equivalent diameter. This "average circular equivalent diameter" is measured by a process in which the columnar crystal scintillator layer is coated with a conductive substance (such as platinum, palladium, gold or carbon) and analyzed with a scanning electron microscope (SEM) (S-800 manufactured by Hitachi, Ltd.) to determine the diameters of circles circumscribed around the cross sections of respective columnar crystals, and the thus-obtained circular equivalent diameters of thirty columnar crystals are averaged.

The average crystal diameter a of the columnar crystals at a height of 1 μm, and the average crystal diameter b of the columnar crystals at a height of 3 μm are each an average of crystal diameters obtained by the observation of crystal faces exposed by filling the crystals with an appropriate resin such as an epoxy resin and polishing the surface of the crystal film until the thickness from the substrate side becomes 1 μm or 3 μm.

Preferably, the phosphor raw material that is used to form the scintillator layer has a total impurity content of 2.5 ppm to 35 ppm wherein the total impurity content is the content of an impurity or impurities, except the activator, having a higher melting point than the phosphor raw material.

Impurities having a higher melting point than the phosphor raw material are not melted or evaporated even at a temperature at which the phosphor raw material is heated. As a result, the phosphor raw material is applied to the substrate 11 while the impurities are included inside the phosphor raw material that has been melted or evaporated. The phosphor raw material that has been heated and melted is deposited onto the substrate 11 and forms the columnar phosphor crystals in such a way that the progress of fusion bonding of the columnar phosphor crystals in the direction of the plane of the deposition substrate is limited to a certain degree because of the shadowing effect (particles that have been generated are scattered at various angles during the travel to the substrate and the particles that are flying are restrained from landing onto the shadows of particles already deposited on the deposition substrate) and also because of the influence of an inert gas in the deposition apparatus 40. That is, impurities with a higher melting point than the phosphor raw material are in the form of solid particles when they are applied onto the surface of the columnar crystals at a temperature at which the phosphor raw material has been heated, and thus such solid particles prevent the crystals of the phosphor raw material from attaching to each other similarly to the inert gas effect. In this manner, the independency of the columnar phosphor crystals may be effectively ensured. In the specification, the term "deposition substrate" refers to the substrate or a stack of the substrate and an additional layer such as a reflective layer or a pigment layer disposed on the substrate.

As described above, the phosphor raw material having a total content of impurities except the activator of 2.5 ppm to 35 ppm may be deposited onto the substrate 11 so as to form highly independent columnar crystals, and consequently the flexibility of the scintillator layer 12 may be further enhanced.

Examples of the impurities include compounds containing one or more elements selected from magnesium (Mg), calcium (Ca), strontium (Sr), barium (Ba), aluminum (Al), silicon (Si), nickel (Ni), copper (Cu), iron (Fe), manganese (Mn), chromium (Cr), molybdenum (Mo) and tantalum (Ta).

In the specification, the term "phosphor base material" refers to the phosphor itself such as CsI that is not activated with activators. The raw materials for the scintillator layer such as the phosphor base material and the activator are collectively referred to as the "phosphor raw material".

As mentioned hereinabove, the scintillator layer 12 in the invention may be a phosphor layer 121 alone or may include a phosphor layer 121 and an underlayer 122. That is, the scintillator layer 12 may be composed of a phosphor layer 121 alone or may be a stack of an underlayer 122 and a phosphor layer 121 which are disposed in this order on the substrate 11. When the scintillator layer 12 is a two-layer structure including an underlayer 122 and a phosphor layer 121, the underlayer 122 may be composed of the same material as the phosphor layer 121. That is, the scintillator layer 12 may be a single layer entirely composed of a phosphor base material alone or a single layer entirely composed of a phosphor base material and an activator, or may be a combination of an underlayer 122 composed of a phosphor base material alone and a phosphor layer 121 including the phosphor base material and an activator, or may be a combination of an underlayer 122 including a phosphor base material and a first activator and a phosphor layer 121 including the phosphor base material and a second activator different from the first activator.

Preferably, the scintillator layer 12 in the invention has a structure in which an underlayer 122 and a phosphor layer 121 are stacked in this order, the phosphor layer 121 includes a phosphor base material and an activator, and the underlayer 122 includes the phosphor base material and an activator and has a lower void content in root portions than the phosphor layer 121.

When the scintillator panel is held in a cantilever condition and is bent under a uniformly distributed load with the columnar crystal structure side being bent outward, the scintillator layer exhibits a flexural elastic modulus Esc satisfying relationships represented by Expression (I) below:

$$Esc \leq -0.43M+372 \text{ and } Esc \geq -0.16M+98 \quad (I)$$

In Expression (I), Esc is the flexural elastic modulus (kg/mm$^2$) of the scintillator layer and M is the thickness (μm) of the scintillator layer.

Figure 5:
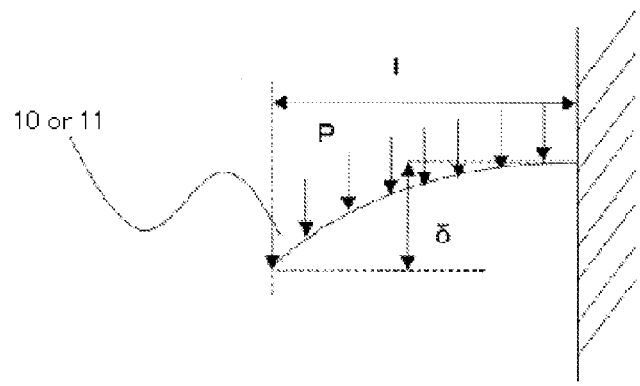
FIG. 5 illustrates a method for determining the deflection of a cantilever (a scintillator layer) under a uniformly distributed load.
Figure 6:
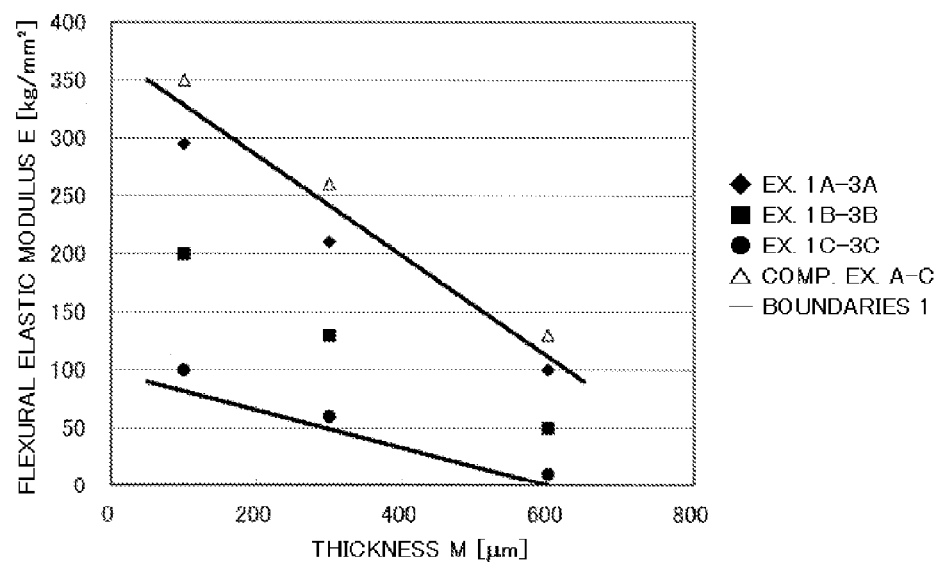
FIG. 6 is a graph representing the flexural elastic moduli Esc of scintillator layers plotted versus the thickness of the scintillator layers.

A specific measurement method is described below. As illustrated in FIG. 5, the flexural elastic modulus Esp of the scintillator panel and the flexural elastic modulus Esb of the substrate are determined, and the flexural elastic modulus Esc of the scintillator layer is calculated from the equation of flexural rigidity using the measured values and also the respective moments of inertia of areas of the scintillator layer (Isc), the scintillator panel (Isp) and the substrate (Isb).

Equation of Flexural Rigidity:

$$EscIsc = EspIsp - EsbIsb$$

$$Esc = (EspIsp - EsbIsb)/Isc$$

Moments of Inertia of Areas:
I=bh$^3$/12 (b: sample width (mm), h: sample thickness (mm))
Isc: moment of inertia of area of scintillator layer
Isp: moment of inertia of area of scintillator panel
Isb: moment of inertia of area of substrate The scintillator layer may achieve a flexural elastic modulus satisfying Equation (I) when the total content of impurities, except the activator, having a higher melting point than the phosphor raw material is 2.5 ppm to 35 ppm, and preferably when the total content of such impurities except the activator is in the above range and the scintillator layer includes a phosphor layer 121 and an underlayer 122.

In the specification, the term "void content" refers to the ratio of the total sectional area of voids to the sum of the total sectional area of the columnar phosphor crystals plus the total sectional area of the voids with respect to cross sections of the scintillator layer parallel to the plane of the substrate. The void content may be determined by cutting the phosphor layer 121 or the underlayer 122 of the scintillator panel parallel to the plane of the substrate 11, and digitizing the phosphor portions and the voids in a scanning electron micrograph of the cross section with use of an image processing software. By allowing the void content in the underlayer 122 to have a gradient in the thickness direction toward the phosphor layer, impact resistance and brightness may be improved while maintaining sharpness.

In the invention, the coefficient of variation in the void content of the columnar phosphor crystals is usually not more than 50%, preferably not more than 20%, and still more preferably not more than 10%.

The term "root portions" refers to portions in the scintillator layer 12 which are found in the vicinity of the substrate 11. In detail, the root portions usually extend from the end of the scintillator layer 12 on the substrate 11 side to a height of above 0 μm to not more than 3 μm.

In the underlayer 122, the relative content of the activator is usually 0.01 to 1 mol %, and preferably 0.1 to 0.7 mol % relative to 100 mol % of the phosphor base compound. This relative content of the activator in the underlayer 122 is highly advantageous particularly in terms of the enhancement of emission brightness and also storage properties of the scintillator panels.

When the scintillator layer 12 in the invention includes a phosphor layer 121 and an underlayer 122, it is highly preferable that the relative content of the activator in the underlayer 122 be lower than the relative content of the activator in the phosphor layer 121. The ratio of the relative content of the activator in the underlayer 122 to the relative content of the activator in the phosphor layer 121 ((relative content of activator in underlayer)/(relative content of activator in phosphor layer)) is preferably 0.1 to 0.7.

In the above case, the coefficient of variation in the concentration of thallium (Tl) iodide as the activator component in the plane of the phosphor layer 121 is usually not more than 40%, preferably not more than 30%, more preferably not more than 20%, and particularly preferably not more than 10%.

When X-rays are incident from the lower side of the component constituting the scintillator layer 12, for example, CsI, the consequent light is efficiently propagated toward the ends of the columnar phosphor crystals by virtue of the light guide effects of CsI. The light that has reached the crystal ends is then emitted to the outside of the crystals. In this process, total reflection occurs in the crystals depending on the directions of the light that has reached the crystal ends, and consequently the amount of light emitted from the crystal ends is decreased. That is, the luminous efficiency is significantly changed by controlling the angles of the ends of columnar crystals. From this aspect, the angles of the ends of columnar phosphor crystals are preferably 40 to 80° in order to improve luminous efficiency.

From viewpoints such as the luminous efficiency of the scintillator layer, the degree of orientation based on an X-ray diffraction spectrum with respect to a plane of the component constituting the scintillator layer 12, for example CsI, that has a certain plane index is preferably in the range of 80 to 100% at any position in the direction of layer thickness. For example, the plane index in the columnar crystals of thallium-activated cesium iodide (CsI:Tl) may be any of indices including (100), (110), (111), (200), (211), (220) and (311), and is preferably (200).

In the specification, the "degree of orientation based on an X-ray diffraction spectrum with respect to a plane that has a certain plane index" indicates the proportion of the intensity Ix of the certain plane index relative to the total intensity I of the total including planes with other plane indices. For example, the degree of orientation of the intensity I200 of the (200) plane in an X-ray diffraction spectrum is obtained by "Degree of orientation=I200/I".

For example, the plane indices for the determination of the orientation degree may be measured by X-ray diffractometry (XRD). The X-ray diffractometry may be crystal X-ray diffractometry or powder X-ray diffractometry. The X-ray diffractometry is a versatile analytical technique capable of identifying substances or obtaining information about structures such as crystal phase structures by utilizing a phenomenon in which a characteristic X-ray having a specific wavelength is diffracted by crystalline substances according to the Bragg's equation. The illumination targets may be Cu, Fe and Co, and the illumination outputs are generally about 0 to 50 mA and about 0 to 50 kV in accordance with the performance of the apparatus.

In the radiographic image conversion panel 10 of the invention, the scintillator layer 12 is composed of a plurality of columnar crystals that have independent root portions. Such independent growth of root portions leads to a high degree of orientation of the (200) plane, and makes it easy for a phosphor layer to be grown in the upward direction on the root portions such that the columnar crystals are spaced apart from one another without becoming attached together. As a result, the columnar crystals may attain high independency to increase the flexibility of the scintillator layer of the radiographic image conversion panel 10.

In the radiographic image conversion panel 10 of the invention, the thickness of the scintillator layer is usually 80 to 800 µm, and preferably 100 to 600 µm.

From the viewpoint of the balance between the brightness of the scintillator panel and the sharpness of the obtainable radiographic images, the thickness of the phosphor layer 121 is usually 50 to 1000 µm, preferably 80 to 800 µm, and more preferably 100 to 600 µm.

To achieve high brightness of the scintillator panel and to maintain the sharpness of the obtainable radiographic images, the thickness of the underlayer 122 is usually 0.1 µm to 50 µm, preferably 3 µm to 50 µm, and more preferably 5 µm to 40 µm.

The unevenness in sensitivity may be reduced and high-quality radiographic images may be obtained by aligning the thickness of the phosphor layer 121 such that the thickness distribution in the phosphor layer 121 will be not more than ±20%.

In the case where a protective layer is provided to increase the moisture proofness of the scintillator layer 12, end portions of the columnar phosphor crystals preferably have (a) outwardly curved surfaces, (b) flat surfaces, or (c) 90° or greater angles (obtuse angles) with respect to the protective layer to ensure that the columnar phosphor crystals will not penetrate into the protective layer at high temperature and high humidity and also in view of the suppression of the diffusion of light from the columnar phosphor crystals to the protective layer.

The columnar crystals have larger diameters on the fluorescence emitting side and smaller diameters on the substrate side. Due to this configuration, the packing density of the phosphor in the columns is higher on the fluorescence emitting side than on the substrate side. That is, the gaps are relatively larger on the substrate side. Further, a porous structure is often formed on the side of each columnar crystal. When the porous structure is composed of small pores with a diameter of 1 µm or less, the pore density is preferably less than 100,000 pores/mm$^2$. The presence of 100,000 or more pores per mm$^2$ may adversely affect optical characteristics of radiographic images such as lower sharpness.

Additional Layers

Similarly to known scintillator panels, the radiographic image conversion panel 10 of the invention may include other layers in addition to the substrate 11 and the scintillator layer 12. As illustrated in FIG. 2, the radiographic image conversion panel 10 may include additional layers such as a reflective layer 13 as well as the aforementioned protective layer (not shown), moistureproof protective layer, light-shielding layer and pigment layer between the substrate 11 and the scintillator layer 12.

Reflective Layers

As mentioned hereinabove, the radiographic image conversion panel 10 of the invention may be used in combination with a photoelectric conversion element panel 20 that is coupled to the radiographic image conversion panel via an optical coupling layer disposed on the scintillator layer 12, thereby forming a radiographic image detector 30.

Thus, it is preferable that the radiographic image conversion panel 10 further include a reflective layer 13 between the substrate 11 and the scintillator layer 12 to allow the fluorescence produced in the scintillator layer 12 to be effectively directed to the photoelectric conversion element panel 20. Here, the reflective layer 13 is a layer capable of reflecting the portion of fluorescence produced in the scintillator layer 12 that propagates in a direction toward the substrate 11.

In the invention, the reflective layer 13 may be made of any materials used in conventional scintillator plates, and may be preferably formed using a metal having high reflectance. Examples of the high-reflectance metal films include materials containing metal elements selected from the group consisting of aluminum (Al), silver (Ag), chromium (Cr), copper (Cu), nickel (Ni), magnesium (Mg), platinum (Pt) and gold (Au). The metals usually have an electric conductivity of not less than 6.0 S/m (Siemens per meter), and preferably not less than 30 S/m. From the viewpoints of reflectance and electrical conductivity, Al (40 S/m), Ag (67 S/m) and Au (46 S/m) are preferred. The reflective layer 13 may be composed of light-reflecting particles such as titanium dioxide, and an appropriate binder resin.

The reflective layer 13 may include a single layer, or two or more layers.

The reflective layer 13 may be directly attached onto the substrate by vacuum deposition, sputtering deposition or plating. From the viewpoint of productivity, sputtering deposition is preferred. The thickness of the reflective layer may vary depending on the film production method. The film thickness is usually 50 nm to 400 nm in the case of vacuum deposition, and is usually 20 nm to 200 nm in the case of sputtering deposition.

Protective Layers

To prevent problems such as corrosion of the reflective layer 13 by the components constituting the scintillator layer 12, a protective layer may be disposed between the reflective layer 13 and the scintillator layer 12.

The protective layer is preferably formed by the application and drying of a solution of a resin in a solvent with respect to the surface of the scintillator layer. From the viewpoint of the interlayer adherability with respect to the deposited crystals and to the reflective layer 13, the resins are preferably polymers having a glass transition temperature of 30 to 100° C.

Specific examples of the resins include vinyl chloride copolymers such as vinyl chloride-vinyl acetate copolymer, vinyl chloride-vinylidene chloride copolymer and vinyl chloride-acrylonitrile copolymer; various synthetic rubber resins such as butadiene-acrylonitrile copolymer and styrene-butadiene copolymer; polyurethane resins, polyamide resins, polyvinylbutyrals, polyester resins, cellulose derivatives (such as nitrocellulose), silicon resins, fluororesins and acrylic resins; and thermosetting resins such asphenolic resins, epoxy resins, urea resins, melamine resins, phenoxy resins and urea-formamide resins, with polyester resins being particularly preferable.

The thickness of the protective layer is usually not less than 0.1 μm in terms of adhesion, and is preferably from 0.1 μm to 3.0 μm, and more preferably from 0.2 μm to 2.5 μm in order to ensure smoothness of the surface of the protective layer.

Examples of the solvents used in the formation of the protective layers include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; alicyclic or aromatic compounds such as cyclohexane, cyclohexanone, toluene, benzene and xylene; esters of lower fatty acids with lower alcohols such as methyl acetate, ethyl acetate and butyl acetate; ester compounds such as ethylene glycol monoethyl ester and ethylene glycol monomethyl ester; and dioxane.

The protective layer may include a single layer, or two or more layers.

Moistureproof Protective Layers

Preferably, the radiographic image conversion panel 10 of the invention further includes a moistureproof protective layer covering the outer periphery of the panel. The moistureproof protective layer serves to prevent the entirety of the radiographic image conversion panel from an entry of moisture and to suppress the degradation of the scintillator layer 12.

Examples of the moistureproof protective layers include protective films having low moisture permeability and moistureproof films such as polyparaxylylene films.

Examples of the protective films include polyethylene terephthalate (PET) films, polymethacrylate films, nitrocellulose films, cellulose acetate films, polypropylene films and polyethylene naphthalate films. In accordance with the required moisture proofness, substances such as metal oxides may be deposited onto these protective films and a plurality of such deposition-coated films may be stacked on top of one another.

Examples of the metal oxides include silicon dioxide ($SiO_2$), aluminum oxide ($Al_2O_2$) and indium tin oxide (ITO).

In the radiographic image conversion panel 10, a heat fusible resin is preferably disposed between the substrate 11 and the scintillator layer 12 to seal these layers by fusion bonding.

The heat fusible layers may be any of common resin films which may be fused with an impulse sealer. Examples include, but are not limited to, ethylene-vinyl acetate copolymer (EVA) films, polypropylene (PP) films and polyethylene (PE) films.

To seal the radiographic image conversion panel, the radiographic image conversion panel may be interposed between upper and lower protective films and the end regions of the upper and lower protective films in contact with each other may be sealed by fusion bonding the heat-fusible resins in a vacuum environment.

The thickness of the protective films is preferably 5 to 100 μm.

The protective films are imparted with moisture proofness. In detail, the moisture permeability (or the moisture vapor transmission rate) is usually not more than 50 g/m$^2$·day, preferably not more than 10 g/m$^2$·day, and more preferably not more than 1 g/m$^2$·day. The moisture permeability of the protective films may be measured as described below in accordance with JIS Z 0208. A space is partitioned with the protective film at 40° C., and one side is maintained at 90% relative humidity (RH) and the other side in a dry state using a hygroscopic agent. The mass (g) of vapor passed through the protective film (per 1 m$^2$ of the protective film) in 24 hours is defined as the moisture permeability of the protective film.

In order to obtain or control the moisture permeability of the protective films in the above range and thereby to enhance moisture proofness, it is preferable to use polyethylene terephthalate films or deposition-coated polyethylene terephthalate films having a thin film of aluminum oxide deposited thereon.

The optical transmittance of the protective films is represented as a value relative to the optical transmittance in the absence of the protective films, namely, the optical transmittance of air taken as 100%. The optical transmittance may be obtained from the following equation:

$$\text{Optical transmittance (\%)}=(\text{transmitted light}/\text{incident light})\times 100$$

The moistureproof protective layers may be moistureproof films such as polyparaxylylene films. The substrate 11 having the scintillator layer may be placed in a deposition chamber of a CVD apparatus, and diparaxylylene may be sublimated in the deposition chamber. In this manner, a polyparaxylylene film may be deposited to cover the entirety of the surface of the scintillator layer 12 and the substrate 11 of the radiographic image conversion panel 10.

Light-Shielding Layers

The radiographic image conversion panel of the invention may include a light-shielding layer between the substrate 11 and the scintillator layer 12.

The light-shielding layer includes a material having light-shielding properties.

From the viewpoint of adjusting the reflectance of the substrate, examples of the light-shielding materials include metal materials including one, or two or more substances such as aluminum (Al), silver, (Ag), platinum (Pt), palladium (Pd), gold (Au), copper (Cu), iron (Fe), nickel (Ni), chromium (Cr), cobalt (Co) and stainless steel. In particular, aluminum (Al)- or silver (Ag)-based metal materials are particularly preferable because they impart excellent light-shielding properties and corrosion resistance to the light-shielding layers.

The light-shielding layer may be composed of a single film of the metal material, or may include two or more films of the metal materials.

The light-shielding layer made of such a metal material also serves as an antistatic layer and thus may be suitably used for antistatic purposes. Such an antistatic layer may be formed instead of or in combination with the addition of an antistatic agent to the reflective layer 13. In this case, to prevent static electricity on the deposition substrate, the surface resistivity measured with respect to the surface of the reflective layer 13 opposite to the surface adjacent to the substrate is usually not more than $1.0\times10^{12}\Omega/\square$, preferably not more than $1.0\times10^{11}\Omega/\square$, and still more preferably not more than $1.0\times10^{10}\Omega/\square$ ($\square$ in the unit $\Omega/\square$ indicates square meter).

The light-shielding layer may be provided on the substrate 11 by any methods without limitation such as deposition, sputtering and metal foil lamination. From the viewpoint of the adhesion of the light-shielding layer with the substrate, sputtering is most preferable.

In order to increase the adhesion between the substrate 11 and the light-shielding layer, an intermediate layer is preferably disposed between the substrate 11 and the light-shielding layer. Examples of the materials of the intermediate layer include general adhesive polymers such as epoxy resins, and metals different from the metals in the light-shielding layers (dissimilar metals). Examples of the dissimilar metals include nickel (Ni), cobalt (Co), chromium (Cr), palladium (Pd), titanium (Ti), zirconium (Zr), molybdenum (Mo) and tungsten (W). The intermediate layer may include one, or two or more kinds of these dissimilar metals. In particular, it is preferable that the intermediate layer contains nickel (Ni) or chromium (Cr), or both of these metals in order to achieve high light-shielding properties.

From the viewpoint of luminous efficiency, the thickness of the light-shielding layer or the two-layer structure of the light-shielding layer and the intermediate layer is usually 0.005 to 0.3 μm, and preferably 0.01 to 0.2 μm.

Pigment Layers

The pigment layers are not particularly limited as long as the layers have light-absorbing properties and are pigmented. For example, layers including a pigment and a binder resin may be used.

The pigments may be any known pigments without limitation. Suitable pigments are those capable of absorbing blue or red long-wavelength components which are more prone to scatter, and blue pigments are preferred. Preferred examples of the blue pigments include ultramarine blue and Prussian blue (iron ferrocyanide). Further, organic blue pigments such as phthalocyanine, anthraquinone, indigoid and carbonium- may also be used. Of these, phthalocyanine is preferable from viewpoints such as radiation durability and UV durability of the light-absorbing pigment layers.

Examples of the binder resins include vinyl chloride copolymers such as vinyl chloride-vinyl acetate copolymer, vinyl chloride-vinylidene chloride copolymer and vinyl chloride-acrylonitrile copolymer; various synthetic rubber resins such as butadiene-acrylonitrile copolymer and styrene-butadiene copolymer; polyurethane resins, polyamide resins, polyvinylbutyrals, polyester resins, cellulose derivatives (such as nitrocellulose), silicon resins, fluororesins and acrylic resins; and thermosetting resins such as phenolic resins, epoxy resins, urea resins, melamine resins, phenoxy resins and urea-formamide resins. Of these, hydrophobic resins such as polyester resins and polyurethane resins are preferable because of excellent interlayer adherability with respect to the columnar phosphor crystals formed by deposition and to the substrate. Two or more of the above resins may be used. In particular, controlling of film properties is advantageously facilitated by the combined use of two or more resins having a difference in glass transition temperature (Tg) of not less than 5° C. In this case, the resins may be of the same kind or different kinds as long as their glass transition temperatures are different.

From the viewpoint of light-absorbing properties of the pigment layers, the pigments are preferably used in amounts of 0.01 to 10 parts by weight with respect to 100 parts by weight of the binder resin. This amount of the pigments ensures sufficient coloring of the films and prevents deteriorations in mechanical properties such as elongation and strength of the resin in the pigment layer due to excessive addition of the pigments over the saturated coloration.

From the viewpoint of cuttability, the thickness of the pigment layer is preferably 1 to 500 μm.

Optical Coupling Layers

The radiographic image detector of the invention has an optical coupling layer 23 serving to bond the radiographic image conversion panel and the photoelectric conversion element in intimate contact with each other.

The optical coupling layer 23 has a refractive index n23 that is, in terms of magnitude, equal to any of or between the refractive index n12 of the columnar crystals of the scintillator layer 12 and the refractive index n20 of the outermost layer of the photoelectric conversion element panel 20.

In this embodiment, as mentioned earlier, the columnar crystals of the scintillator layer 12 are CsI:Tl and the refractive index n12 thereof is approximately 1.8. On the other hand, the outermost layer of the photoelectric conversion element panel 20 is formed of an acrylic resin whose refractive index n20 is approximately 1.5. Thus, the optical coupling layer 23 in this embodiment is formed such that its refractive index n23 will be in the range of 1.5 to 1.8. The refractive index may be adjusted by the addition of a filler.

The optical coupling layer 23 is transparent in order to allow the light produced in the scintillator layer 12 upon illumination with radiations to reach the photoelectric conversion element via the optical coupling layer 23 and the outermost layer of the photoelectric conversion element panel 20, and preferably has a high optical transmittance of not less than 90%.

In the case where the resin used to form the optical coupling layer 23 is, for example, a type of resin which is readily shrunk during curing or is apt to be swollen at high temperatures, the shrinkage or the swelling of the optical coupling layer 23 applies a stress to the columnar crystals of the scintillator layer 12 in the plane direction. Such stress may potentially break the columnar crystals.

Thus, it is preferable to form the optical coupling layer 23 using a resin having small cure shrinkage and low linear expansion coefficient.

To avoid the diffusion of light traveling from the phosphor layer, the thickness of the optical coupling layer needs to be small, and is preferably not more than 50 μm, and more preferably not more than 30 μm.

The components for constituting the optical coupling layers are not particularly limited as long as the object of the invention is achieved. Preferred components are thermosetting resins, hot melt sheets and pressure sensitive adhesive sheets.

Examples of the thermosetting resins include resins containing base resins such as acrylic resins, epoxy resins and silicone resins. In particular, acrylic-based and silicone-based resins are preferable because of thermal curability at low temperatures. Examples of the commercial products include methyl silicone-based resin JCR6122 manufactured by Dow Corning Toray Co., Ltd.

The optical coupling layer may be a hot melt sheet. The hot melt sheets in the invention are sheets of adhesive resins which are free from water or solvents, are solid at room temperature, and include nonvolatile thermoplastic materials. (Hereinafter, such resins will be written as "hot melt resins".) Adherends may be bonded to each other via the hot melt sheet by inserting the hot melt sheet between the adherends, then melting the hot melt sheet at or above its melting point, and solidifying the resin at a temperature not more than the melting point. Because of the freedom from polar solvents, solvents or water, the hot melt resins do not cause the deliquescence of phosphor layers even when the hot melt resins are placed in contact with deliquescent phosphor layers (such as phosphor layers having an alkali halide columnar crustal structure). Thus, the hot melt sheets are suited for the bonding of photoelectric conversion elements and phosphor layers. Further, the hot melt sheets do not contain residual volatile components and thus exhibit small shrinkage when dried, namely, have excellent gap-filling properties and dimensional stability.

Examples of the hot melt sheets include sheets based on such resins as polyolefin resins, polyamide resins, polyester resins, polyurethane resins, acrylic resins and EVA resins. Of these, sheets based on polyolefin resins, EVA resins and acrylic resins are preferable from the viewpoints of light transmission properties and adhesion.

The optical coupling layer may be a pressure sensitive adhesive sheet. Specific examples of the pressure sensitive adhesive sheets include sheets based on such materials as acrylics, urethanes, rubbers and silicones. Of these, sheets based on acrylics and silicones are preferable from the viewpoints of light transmission properties and adhesion.

The thermosetting resin as the optical coupling layer may be applied on the scintillator layer or the photoelectric conversion element by a technique such as spin coating, screen printing or dispenser coating.

In the case of the hot melt sheet, the hot melt sheet may be inserted between the scintillator layer and the photoelectric conversion element and heated under reduced pressure to form the optical coupling layer.

The pressure sensitive adhesive sheet may be applied with a device such as a laminating machine.

Photoelectric Conversion Elements

The photoelectric conversion element that constitutes the inventive radiographic image detector includes a transparent electrode, a charge generation layer that generates electric charges by being excited by the electromagnetic waves incident thereon through the transparent electrode, and a counter electrode that makes a pair with the transparent electrode. A separator film is disposed on the surface of the photoelectric conversion element panel to separate the scintillator panel 10 and the photoelectric conversion element. The components of the photoelectric conversion element are disposed in the order of the transparent electrode, the charge generation layer and the counter electrode as viewed from the separator film side.

The transparent electrode is capable of transmitting electromagnetic waves which are to be photoelectric converted and is made of, for example, a conductive transparent material such as ITO, $SnO_2$ or ZnO.

The charge generation layer is disposed in the form of a thin film on the surface of the transparent electrode opposite to the surface in contact with the separator film. The charge generation layer includes photoelectric conversion compounds, namely, organic compounds that undergo charge separation when illuminated with light. The organic compounds which produce charge separation are a conductive compound serving as an electron donor by donating electric charges, and another conductive compound serving as an electron acceptor. When electromagnetic waves such as radiations are incident on the charge generation layer, the electron donor is excited to release electrons, and the released electrons are transferred to the electron acceptor. In this manner, charges, namely, hole and electron carriers are generated in the charge generation layer.

Examples of the conductive compounds as the electron donors include p-type conductive polymer compounds. Preferred p-type conductive polymer compounds are those compounds having a basic skeleton of polyphenylene vinylene, polythiophene, poly(thiophene vinylene), polyacetylene, polypyrrole, polyfluorene, poly(p-phenylene) or polyaniline.

Examples of the conductive compounds as the electron acceptors include n-type conductive polymer compounds. Preferred n-type conductive polymer compounds are those compounds having a basic skeleton of polypyridine, and particularly preferred compounds are those having a basic skeleton of poly(p-pyridyl vinylene).

The thickness of the charge generation layer is preferably not less than 10 nm (particularly not less than 100 nm) in order to ensure a sufficient amount of optical absorption, and is preferably not more than 1 μm (particularly not more than 300 nm) in order to avoid excessively high electric resistance.

The counter electrode is disposed on the surface of the charge generation layer opposite to the surface on which the electromagnetic waves are incident. For example, the counter electrode may be selected from general metal electrodes such as gold, silver, aluminum and chromium, or may be similar to the transparent electrode. In order to achieve good characteristics, the counter electrode is preferably formed from a material with a low work function (not more than 4.5 eV) selected from metals, alloys, electrical conductive compounds and mixtures of these substances.

Between the charge generation layer and each of the electrodes (the transparent electrode and the counter electrode), a buffer layer may be disposed which serves as a buffer zone preventing the reaction between the charge generation layer and the electrode. For example, the buffer layers may be formed using such materials as lithium fluoride, poly(3,4-ethylenedioxythiophene):poly(4-styrene sulfonate), and 2,9-dimethyl-4,7-diphenyl[1,10]phenanthroline.

In the photoelectric conversion element, a protective film layer 36 made of a resin is disposed to cover the photoelectric conversion element, and a plurality of spacers 37 are dispersed. Further, the photoelectric conversion element includes a spacer section 38 stacked on the protective film layer 36, and an electrode section 39 disposed on the protective film layer 36 and around the spacer section 38.

In the invention, for example, PaxScan (FPD: 2520 manufactured by Varian Medical Systems, Inc.) may be used.

Radiographic Image Conversion Panels

As mentioned hereinabove, the radiographic image conversion panel of the invention includes a substrate 11 and a scintillator layer 12 disposed on the substrate. The scintillator layer 12 is a structure in which an underlayer 122 and a phosphor layer 121 are stacked together in this order, and includes a plurality of columnar phosphor crystals that have independent root portions adjacent to the substrate (the first configuration). Such independent growth of root portions leads to a high degree of orientation of the (200) plane, and makes it easy for the phosphor layer to be grown in the upward direction on the root portions such that the columnar crystals will be grown independently without becoming attached together. As a result, the columnar crystals may attain high independency to increase the flexibility of the scintillator layer of the radiographic image conversion panel 10.

A more preferred embodiment of the first configuration involves a phosphor raw material which has a total impurity content of 2.5 ppm to 35 ppm wherein the total impurity content is the content of impurities, except the activator, having a higher melting point than the phosphor raw material. This configuration allows the plurality of columnar crystals constituting the scintillator layer 12 to be connected together into a non-columnar crystal at the root portions adjacent to the substrate, and also to be independent from one another in the phosphor layer above the root portions, thus preventing the fusion bonding of the columnar crystals (the second configuration). As a result, the columnar crystals according to the second configuration may attain high independency to further increase the flexibility of the scintillator layer of the radiographic image conversion panel 10.

In a more preferred embodiment of the second configuration, the radiographic image conversion panel includes a substrate 11 and a scintillator layer 12 disposed on the substrate, and the scintillator layer 12 is a structure in which an underlayer 122 and a phosphor layer 121 are stacked together in this order. Further, this embodiment involves a phosphor raw material which has a total impurity content of 2.5 ppm to 35 ppm wherein the total impurity content is the content of impurities, except the activator, having a higher melting point than the phosphor raw material. With this configuration, the plurality of columnar crystals constituting the scintillator layer 12 are independent from one another at the root portions adjacent to the substrate, and are also independent from one another in the phosphor layer above the root portions (the third configuration).

Methods for Manufacturing Radiographic Image Conversion Panels

For example, the radiographic image conversion panel 10 of the invention may be manufactured as described below so that the columnar phosphor crystals constituting the scintillator layer 12 will have independent root portions.

In detail, the radiographic image conversion panel 10 may be obtained by optionally forming layers such as a reflective layer 13 and a protective layer on a substrate 11 according to known techniques, and thereafter forming a scintillator layer 12 and further a moistureproof protective layer as required by a known method. Here, the layers such as the reflective layer 13, the protective layer and the moistureproof protective layer may be formed by the methods described in the sub-sections of "Reflective layers", "Protective layers" and "Moistureproof protective layers" in the section of "Additional layers".

The formation of the scintillator layer 12 is not limited to any particular methods as long as the phosphor raw material may be allowed to form columnar crystals and the columnar crystals may be formed such that the root portions of the columnar crystals are independent from one another. In the invention, however, a gas-phase method, specifically, a deposition method is preferable.

Figure 3:
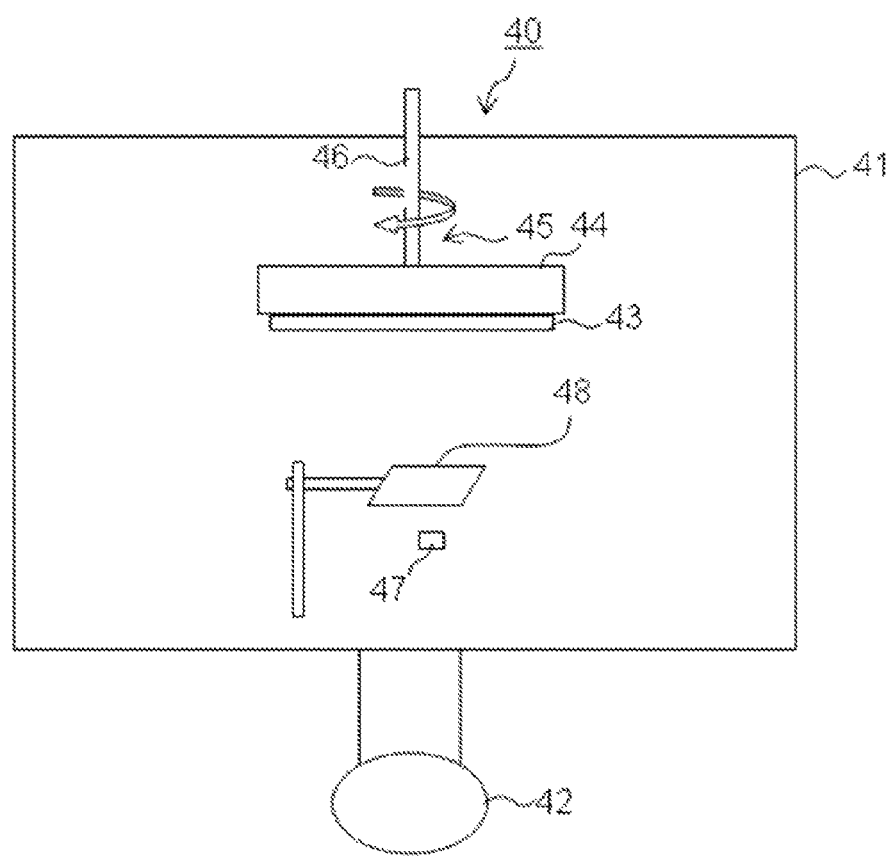
FIG. 3 is a view illustrating a schematic configuration of a deposition apparatus.

While the apparatuses used in the deposition methods are not particularly limited, for example, a deposition apparatus illustrated in FIG. 3 is preferably used.

Figure 4:
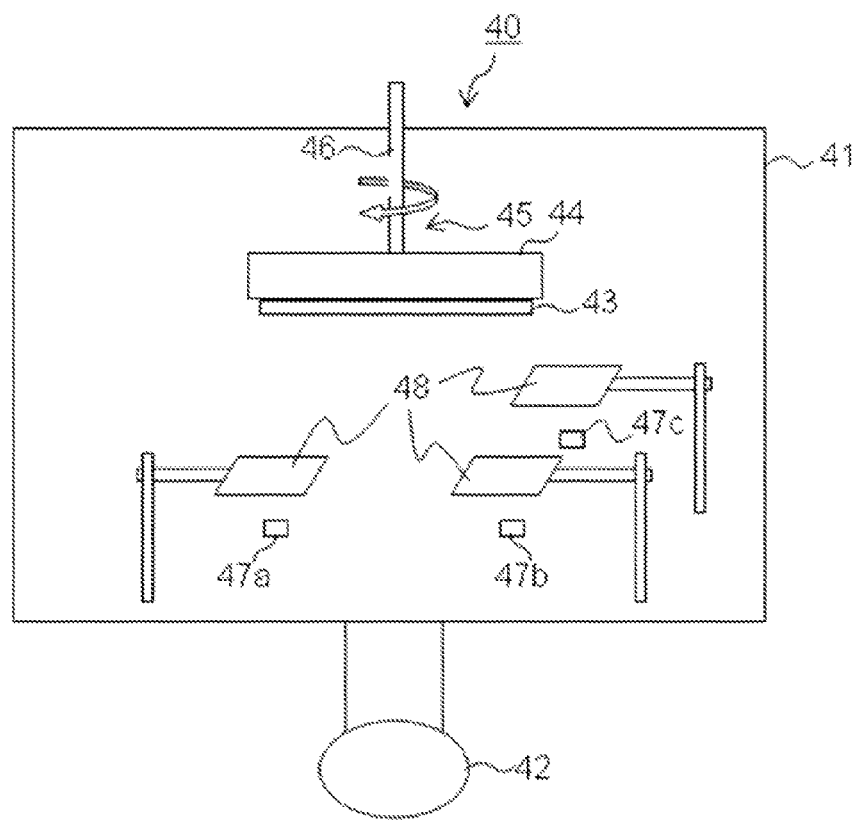
FIG. 4 is a sectional view illustrating a radiographic image conversion panel production apparatus.

As illustrated in FIG. 3, a deposition apparatus 40 has a box-shaped vacuum container 41, in which a deposition source 47 is arranged. The deposition source 47 is placed in a container furnished with a heating device, and may be heated by the operation of the heating device. For the formation of a scintillator layer 12, a phosphor raw material, or a mixture including a phosphor as a phosphor base material and an activator is loaded in the container furnished with a heating device. Namely, the phosphor raw material or the mixture as the deposition source 47 may be heated and vaporized by the operation of the heating device. The heating temperature for the deposition source 47 is usually 650 to 800° C., and preferably 680 to 750° C. As illustrated in FIG. 4, a plurality of deposition sources 47 may be disposed. While FIG. 4 illustrates three deposition sources 47, namely, deposition sources 47a, 47b and 47c, the number of deposition sources may be changed with respect to materials for forming the scintillator layer 12. The deposition sources may be arranged at regular or irregular intervals. The radius of the circle about the central line perpendicular to a deposition substrate 43 may be selected freely. By appropriately designing the arrangement of deposition sources, deposition may be performed with in-plane uniformity over a large area of the deposition substrate 43. That is, deposition realizes uniform in-plane distribution over a large area so as to satisfy the aforementioned activator concentration, crystal diameters and film thickness distribution. The deposition according to such a method not only realizes gang printing or multiple patterning in a single sheet of substrate but also realizes multiple patterning by setting a plurality of substrate sheets at the same time. Alternatively, deposition may be performed on a single large substrate, which may then be cut into a plurality of sheets. Thus, efficient production becomes feasible.

The container furnished with a heating device may be a resistance-heating crucible. Here, the material of the container may be alumina or a high-melting metal.

In the vacuum container 41, a holder 44 for holding the deposition substrate 43 is disposed immediately above the deposition source 47. Here, the deposition substrate 43 may be a substrate 11 itself or a stack of a substrate 11 with layers such as a reflective layer 13 and a protective layer.

The holder 44 is provided with a heater (not shown) and is configured to heat the deposition substrate 43 attached to the holder 44 by the operation of the heater. Heating of the deposition substrate 43 detaches or removes substances adsorbed to the surface of the deposition substrate 43, prevents an impurity layer from occurring between the deposition substrate 43 and the scintillator layer 12 formed on the substrate surface, increases the adhesion between the deposition substrate 43 and the scintillator layer 12, and controls the quality of the scintillator layer 12 formed on the surface of the deposition substrate 43.

The holder 44 is provided with a rotating mechanism 45 capable of rotating the holder 44. The rotating mechanism 45 is composed of a rotating shaft 46 connected to the holder 44, and a motor (not shown) which serves as a power supply driving the rotating shaft 46. Driving of the motor causes the rotating shaft 46 to be rotated and hence causes the holder 44 to be rotated while being opposed to the deposition source 47.

In addition to the above configuration, the deposition apparatus 40 includes a vacuum pump 42 connected to the vacuum container 41. The vacuum pump 42 evacuates the vacuum container 41 and introduces a gas to the inside of the vacuum container 41. The inside of the vacuum container 41 can be maintained in a constant pressure gas atmosphere by the operation of the vacuum pump 42. The vacuum pump 42 removes the gas present inside the vacuum container. In order to evacuate the vacuum container to a high vacuum, two or more types of vacuum pumps having different operating pressure ranges may be arranged. Examples of the vacuum pumps include rotary pumps, turbo-molecular pumps, cryogenic pumps, diffusion pumps and mechanical boosters.

In the formation of a scintillator layer 12 of the invention, a phosphor raw material is loaded into the container furnished with a heating device, and the apparatus is evacuated while an inert gas such as nitrogen is simultaneously introduced through an inlet to adjust the pressure at approximately 1.333 Pa to $1.33 \times 10^{-3}$ Pa. Subsequently, the phosphor raw material is heated and vaporized to deposit phosphor crystals onto the surface of the deposition substrate 43 which may have additional layers such as the reflective layer 13 and the protective layer as required, thereby forming a scintillator layer 12. When the crystal deposition involves a mixture of a phosphor base material and an activator, a deposition apparatus 40 illustrated in FIG. 4 may be used, and the phosphor as the phosphor base material may be loaded into a first container furnished with a heating device and the activator into a second container furnished with a heating device to form deposition sources 47a and 47b, respectively.

To form a scintillator layer 12 having an underlayer 122 and a phosphor layer 121, a phosphor raw material for the formation of underlayer 122, a phosphor raw material for the formation of phosphor layer 121, and an activator for the formation of phosphor layer 121 may be loaded into respective containers having separate heating devices, and deposition may be performed while controlling the amounts of the deposition sources loaded and operating shutters 48 in accordance with the implementation of deposition of the respective deposition sources.

The crystal diameters of the columnar phosphor crystals formed on the deposition substrate 43 may be controlled by regulating the temperature of the deposition substrate 43. That is, the crystal diameters may be increased with increasing temperature of the deposition substrate 43. During the deposition of the phosphor layer, the temperature of the deposition substrate is usually 150 to 250° C., and preferably 180 to 220° C. The rate of deposition of the phosphor raw material and the pressure in the vacuum container 41 during the deposition also have some effects on the crystal diameters. To ensure that the average crystal diameter b of the columnar phosphor crystals will be not more than 3 μm, the temperature of the substrate for the deposition of the underlayer and the phosphor layer is preferably set at 5° C. to 250° C. provided that, for example, the deposition rate is not more than 3 μm/min and the vacuum degree is 0.01 to 1 Pa. Further, the rate of heating of the deposition substrate 43 at an initial stage of deposition is preferably controlled to an appropriately low rate in order to ensure an appropriately low ratio (b/a) of the average crystal diameter b of the columnar phosphor crystals at a height of 3 μm to the average crystal diameter a of the columnar phosphor crystals at a height of 1 μm. For example, it is preferable that the difference in substrate temperature until the formation of 3 μm root portions be within 100° C. Heating of the deposition substrate 43 at an excessively high rate may cause local discontinuous changes in crystal diameters of the columnar phosphor crystals in the scintillator layer 12. But the presence of such variations does not prevent the inventive radiographic image conversion panels 10 from functioning appropriately.

When the scintillator layer 12 includes an underlayer 122 and a phosphor layer 121, the thickness of the underlayer 122 defined in the section of "Scintillator layers" may be obtained by performing deposition while controlling the amount of the phosphor raw material loaded in the container furnished with a heating device (for example, a resistance-heating crucible) for the deposition of underlayer 122, or while operating the shutter 48 appropriately. In order to ensure that the columnar crystals have independent root portions and also that the obtainable radiographic image conversion panels achieve excellent X-ray characteristics such as brightness and sharpness, it is preferable that the temperature of the deposition substrate 43 during the formation of the underlayer 122 be 15° C. to 50° C., and it is particularly preferable that the deposition substrate 43 be not heated during the formation of the underlayer 122.

The phosphor layer 121 may be formed by depositing crystals onto the underlayer 122 in the same manner as above by heating and vaporizing a mixture of the phosphor base material and an activator loaded in a container furnished with a heating device, or by heating and vaporizing the phosphor base material and an activator loaded in respective containers furnished with separate heating devices. The thickness of the phosphor layer 121 may be adjusted by controlling the amount of the phosphor base material (and the activator) loaded in the container(s) furnished with a heating device for the formation of phosphor layer 121, or by operating the shutter (s) appropriately. Heating of the deposition substrate 43 is preferably started from the formation of the phosphor layer 121. During the formation of the phosphor layer 121, the temperature of the deposition substrate 43 is preferably 100° C. or above at the start of the formation of the phosphor layer 121, and is preferably maintained at 150° C. to 250° C. during the subsequent period until the deposition is completed.

In the case where the underlayer 122 is formed, it is important that the phosphor be deposited such that the root portions will not contain an activator in order to ensure the formation of independent root portions. After the root portions are formed, the phosphor and an activator are deposited while heating the entirety of the deposition substrate 43 including the root portions. During this process, the activator is diffused into the root portions. Thus, brightness and sharpness may be obtained while ensuring that the root portions are independent from one another. That is, a structure is obtained which allows the radiographic image conversion panel to ensure brightness and sharpness while exhibiting sufficient flexibility of the scintillator layer. If the phosphor is deposited together with an activator during the formation of root portions, the root portions fail to form independent columns.

EXAMPLES

The present invention will be described in detail based on examples hereinbelow without limiting the scope of the invention.

Example 1A

Substrate

A 125 μm thick polyimide film (UPILEX-125S manufactured by UBE INDUSTRIES, INC.) was used as a substrate.
(Formation of Scintillator Layer)

A scintillator layer was formed on the substrate with a deposition apparatus illustrated in FIG. 4 in the following manner.

First, a phosphor raw material X as a deposition material was loaded into two resistance-heating crucibles, and an activator (TlI) was added into another resistance-heating crucible. In this phosphor raw material X, the total content of impurities except the activator having a higher melting point than cesium iodide (CsI) as the phosphor raw material was less than 2.5 ppm. Here, the two resistance-heating crucibles packed with the phosphor raw material X will be referred to as the first and the second resistance-heating crucibles, and the resistance-heating crucible packed with the activator will be referred to as the third resistance-heating crucible. The contents in these first, second and third resistance-heating crucibles were deposition sources 47a, 47b and 47c, respectively. The substrate as a deposition substrate 43 was placed onto a rotatable holder 44. The distance between the deposition substrate 43 and each of the deposition sources 47a, 47b and 47c was adjusted to 400 mm.

Next, the air in a vacuum container 41 of the deposition apparatus 40 was evacuated and the degree of vacuum in the vacuum container 41 in the deposition apparatus 40 was adjusted to 0.5 Pa (absolute pressure) by introducing Ar gas. Thereafter, the deposition substrate 43 together with the holder 44 was rotated at 10 rpm.

The first resistance-heating crucible was heated to allow the phosphor to be deposited onto the scintillator layer formation scheduled surface of the deposition substrate 43, thereby forming an underlayer portion with a thickness of 3 μm. The temperature of the deposition substrate 43 at the start of deposition was 5° C., and was gradually increased to 25° C. at the formation of the 3 μm thick underlayer portion.

Subsequently, the temperature of the deposition substrate 43 was controlled to 200° C., and the second resistance-heating crucible and the third resistance-heating crucible were heated to allow the phosphor and the activator to be deposited onto the scintillator layer formation scheduled surface of the deposition substrate, thereby forming a phosphor layer portion. The activator concentration in the scintillator layer was controlled to 0.3 mol %.

The deposition was terminated when the thickness of the scintillator layer reached 100 μm. Thus, a scintillator panel was obtained which had the scintillator layer in the prescribed film thickness on the scintillator layer formation scheduled surface of the deposition substrate.

Example 2A

A scintillator layer was formed on the substrate with a deposition apparatus illustrated in FIG. 4 in the following manner.

First, a phosphor raw material Y as a deposition material was loaded into a first resistance-heating crucible, and an activator (TlI) was added into a second resistance-heating crucible. In this phosphor raw material Y, the total content of impurities except the activator having a higher melting point than cesium iodide (CsI) as the phosphor raw material was between 2.5 ppm and 35 ppm. The contents in these resistance-heating crucibles were deposition sources 47a and 47b, respectively. The substrate as a deposition substrate 43 was placed onto a rotatable holder 44. The distance between the deposition substrate 43 and each of the deposition sources 47 was adjusted to 400 mm.

Next, the air in a vacuum container 41 of the deposition apparatus 40 was evacuated and the degree of vacuum in the vacuum container 41 in the deposition apparatus 40 was adjusted to 0.5 Pa (absolute pressure) by introducing Ar gas. Thereafter, the deposition substrate 43 together with the holder 44 was rotated at 10 rpm. The temperature of the deposition substrate 43 was brought to 200° C. at the start of deposition, and both the first resistance-heating crucible and the second resistance-heating crucible were heated to allow the phosphor raw material to be deposited onto the scintillator layer formation scheduled surface of the deposition substrate 43. The activator concentration in the scintillator layer was controlled to 0.3 mol %. Here, the deposition substrate 43 was heated by heating the holder 43.

The deposition was terminated when the thickness of the scintillator layer reached 100 μm. Thus, a scintillator panel was obtained which had the scintillator layer in the prescribed film thickness on the scintillator layer formation scheduled surface of the deposition substrate.

Example 3A

A scintillator panel which had a 100 μm thick scintillator layer on the scintillator layer formation scheduled surface of the deposition substrate was obtained in the same manner as in Example 1A, except that the deposition material used was the phosphor raw material Y in which the total content of impurities except the activator having a higher melting point than cesium iodide (CsI) as the phosphor raw material was between 2.5 ppm and 35 ppm.

Comparative Example A

A scintillator panel which had a 100 μm thick scintillator layer was obtained in the same manner as in Example 2A, except that the phosphor raw material was the phosphor raw material X.

Example 1B

A scintillator panel was obtained in the same manner as in Example 1A, except that the deposition was terminated when the thickness of the scintillator layer reached 300 μm.

Example 2B

A scintillator panel was obtained in the same manner as in Example 2A, except that the deposition was terminated when the thickness of the scintillator layer reached 300 μm.

Example 3B

A scintillator panel was obtained in the same manner as in Example 3A, except that the deposition was terminated when the thickness of the scintillator layer reached 300 μm.

Comparative Example B

A scintillator panel was obtained in the same manner as in Comparative Example A, except that the deposition was terminated when the thickness of the scintillator layer reached 300 μm.

Example 1C

A scintillator panel was obtained in the same manner as in Example 1A, except that the deposition was terminated when the thickness of the scintillator layer reached 600 μm.

Example 2C

A scintillator panel was obtained in the same manner as in Example 2A, except that the deposition was terminated when the thickness of the scintillator layer reached 600 μm.

Example 3C

A scintillator panel was obtained in the same manner as in Example 3A, except that the deposition was terminated when the thickness of the scintillator layer reached 600 μm.

Comparative Example C

A scintillator panel was obtained in the same manner as in Comparative Example A, except that the deposition was terminated when the thickness of the scintillator layer reached 600 μm.

[Evaluation of Scintillator Panels]

The scintillator panels obtained in Examples and Comparative Examples were tested to evaluate brightness, MTF (modulation transfer function) and image unevenness.

To evaluate brightness and MTF, the scintillator panel was coupled to the photoelectric conversion element on the surface of PaxScan (FPD: 2520 manufactured by Varian Medical Systems, Inc.) via any of the following optical coupling layers.

(Optical Coupling Layers)

The following three materials were used to form the optical coupling layers.

Thermosetting resin: methyl silicone-based resin JCR6122 manufactured by Dow Corning Toray Co., Ltd., viscosity 340 mPa·s Hot melt sheet: polyester-based sheet DAITAC LT6003W manufactured by DIC Pressure sensitive adhesive: acrylic-based adhesive TL-4505-16 manufactured by Lintec Corporation (Evaluation of Scintillator Panels)

Flexural Elastic Modulus Esc of Scintillator Layer

The flexural elastic modulus Esc of the scintillator layer may be calculated based on the equation of flexural rigidity using (measured values of) the flexural elastic moduli of the scintillator panel (Esp) and of the substrate (Esb) and also the respective moments of inertia of areas of the scintillator layer (Isc), the scintillator panel (Isp) and the substrate (Isb).

Equation of flexural rigidity: $EscIsc = EspIsp - EsbIsb$

Moments of Inertia of Areas:

$I = bh^3/12$ (b: sample width (mm), h: sample thickness (mm))

Isc: moment of inertia of area of scintillator layer
Isp: moment of inertia of area of scintillator panel
Isb: moment of inertia of area of substrate The flexural elastic moduli of the scintillator panel (Esp) and of the substrate (Esb) may be calculated using the following equation based on results of a cantilever experiment (under a uniformly distributed load) illustrated in FIG. 5.

$E = Pl^4/(8\delta I)$ wherein:
E: flexural elastic modulus (kg/mm$^2$)
l: cantilever length (mm)
δ: maximum deflection (mm)
I: moment of inertia of area (mm$^4$)

Brightness

At a tube voltage of 80 kVp, a flat panel detector (FPD) was illuminated with X-rays. The obtained image data was analyzed to determine the average signal value as the amount of luminescence.

Because characteristics of scintillator panels vary greatly depending on the thickness of the scintillator layers, brightness was evaluated by relative evaluation in which the flat panel displays having the same thickness of the scintillator layers were compared. The results in Table 1 are ratings relative to the amount of luminescence in Comparative Examples A to C taken as brightness 1.0, and the symbols show that the amounts of luminescence were "Δ": 1.0 time (equivalent) to less than 1.2 times, "○": 1.2 times to less than 1.4 times, and "⊙": 1.4 times or greater than the amount of luminescence obtained in Comparative Examples A to C.

MTF

At a tube voltage of 80 kVp, the radiation incident side of the FPD was illuminated with X-rays through a lead MTF chart. The image data was detected and was recorded on a hard disk. Thereafter, the image data recorded on the hard disk was analyzed with a computer to determine MTF values (at a spatial frequency of 1 cycle/mm) of the X-ray image recorded on the hard disk, as the indicator of sharpness. A larger value of MTF indicates higher sharpness.

The MTF values were measured with respect to nine locations in the radiographic image conversion panel, and the results were averaged. Because characteristics of scintillator panels vary greatly depending on the thickness of the scintillator layers, sharpness was evaluated by relative evaluation in which the panels having the same thickness of the scintillator layers were compared. The results in Table 1 are ratings relative to the sharpness of Comparative Examples A to C taken as the acceptable standard, and the symbols show that the sharpness was "Δ": 1.0 time (equivalent) to less than 1.2 times, "○": 1.2 times to less than 1.4 times, and "⊙": 1.4 times or greater than the sharpness obtained in Comparative Examples A to C.

Image Unevenness

The images obtained in the evaluation of brightness (before flat correction) were analyzed to evaluate unevenness. The results described in Table 1 show that the variation in brightness was "x": 20% or above, "Δ": from 10% to less than 20%, "○": from 5% to less than 10%, and "⊙": less than 5%.

TABLE 1

| | | Properties of scintillator layer | | | | Image evaluation results with thermosetting resin | | |
|---|---|---|---|---|---|---|---|---|
| | Root shape | Scintillator layer thickness [μm] | Underlayer | Content of trace elements in CsI raw material | Flexural elastic modulus of scintillator layer [kg/mm$^2$] | Brightness | MTF | Image unevenness |
| Ex. 1A | Columnar | 100 | Present | Below 2.5 ppm | 295 | ○ | ○ | Δ |
| Ex. 2A | Not columnar | 100 | Absent | 3-35 ppm | 200 | ⊙ | ○ | ○ |
| Ex. 3A | Columnar | 100 | Present | 3-35 ppm | 100 | ⊙ | ⊙ | ⊙ |
| Comp. Ex. A | Not columnar | 100 | Absent | Below 2.5 ppm | 350 | Δ | Δ | X |
| Ex. 1B | Columnar | 300 | Present | Below 2.5 ppm | 210 | ○ | ○ | Δ |
| Ex. 2B | Not columnar | 300 | Absent | 3-35 ppm | 130 | ⊙ | ○ | ○ |
| Ex. 3B | Columnar | 300 | Present | 3-35 ppm | 60 | ⊙ | ⊙ | ⊙ |
| Comp. Ex. B | Not columnar | 300 | Absent | Below 2.5 ppm | 260 | Δ | Δ | X |
| Ex. 1C | Columnar | 600 | Present | Below 2.5 ppm | 100 | ○ | ○ | Δ |
| Ex. 2C | Not columnar | 600 | Absent | 3-35 ppm | 50 | ⊙ | ○ | ○ |
| Ex. 3C | Columnar | 600 | Present | 3-35 ppm | 10 | ⊙ | ⊙ | ⊙ |
| Comp. Ex. C | Not columnar | 600 | Absent | Below 2.5 ppm | 130 | Δ | Δ | X |

| | Image evaluation results with hot melt sheet | | | Image evaluation results with pressure sensitive adhesive | | |
|---|---|---|---|---|---|---|
| | Brightness | MTF | Image unevenness | Brightness | MTF | Image unevenness |
| Ex. 1A | ○ | ○ | Δ | ○ | ○ | Δ |
| Ex. 2A | ⊙ | ○ | ○ | ⊙ | ○ | ○ |
| Ex. 3A | ⊙ | ⊙ | ⊙ | ⊙ | ⊙ | ⊙ |

TABLE 1-continued

| | | | | | | |
|---|---|---|---|---|---|---|
| Comp. Ex. A | Δ | Δ | X | Δ | Δ | X |
| Ex. 1B | ○ | ○ | Δ | ○ | ○ | Δ |
| Ex. 2B | ⊙ | ○ | ○ | ⊙ | ○ | ○ |
| Ex. 3B | ⊙ | ⊙ | ⊙ | ⊙ | ⊙ | ⊙ |
| Comp. Ex. B | Δ | Δ | X | Δ | Δ | X |
| Ex. 1C | ○ | ○ | Δ | ○ | ○ | Δ |
| Ex. 2C | ⊙ | ○ | ○ | ⊙ | ○ | ○ |
| Ex. 3C | ⊙ | ⊙ | ⊙ | ⊙ | ⊙ | ⊙ |
| Comp. Ex. C | Δ | Δ | X | Δ | Δ | X |

INDUSTRIAL APPLICABILITY

The radiographic image detectors according to the invention are suitably applied to scintillators for X-ray detectors having curved sensor units such as C-shaped X-ray line cameras used for high-speed defect inspection or quality control.

REFERENCE SIGNS LIST

10 . . . INVENTIVE FIRST RADIOGRAPHIC IMAGE CONVERSION PANEL
90 . . . CONVENTIONAL RADIOGRAPHIC IMAGE CONVERSION PANEL
11, 91 . . . SUBSTRATE
12, 92 . . . SCINTILLATOR LAYER
120, 920 . . . COLUMNAR CRYSTALS
121 . . . PHOSPHOR LAYER
122 . . . UNDERLAYER
13 . . . REFLECTIVE LAYER
20 . . . PHOTOELECTRIC CONVERSION ELEMENT PANEL
23 . . . OPTICAL COUPLING LAYER
30 . . . RADIOGRAPHIC IMAGE DETECTOR
40 . . . DEPOSITION APPARATUS
41 . . . VACUUM CONTAINER
42 . . . VACUUM PUMP
43 . . . DEPOSITION SUBSTRATE
44 . . . HOLDER
45 . . . ROTATING MECHANISM
46 . . . ROTATING SHAFT
47, 47a, 47b, 47c . . . DEPOSITION SOURCE
48 . . . SHUTTERS

What is claimed is:

1. A radiographic image detector comprising a substrate, a scintillator layer with a columnar crystal structure disposed on the substrate, an optical coupling layer and a photoelectric conversion element,
the scintillator layer having a flexural elastic modulus Esc satisfying relationships represented by Expression (I) as measured by a cantilever test in which the scintillator layer disposed on the substrate is held in a cantilever condition and is bent under a uniformly distributed load with the columnar crystal structure side being bent outward:

$$Esc \leq -0.43M + 372 \text{ and } Esc \geq -0.16M + 98 \quad (I)$$

(in Expression (I), Esc is the flexural elastic modulus (kg/mm$^2$) of the scintillator layer and M is the thickness (μm) of the scintillator layer).

2. The radiographic image detector according to claim 1, wherein the scintillator layer includes an underlayer and a phosphor layer, and the underlayer and the phosphor layer are stacked in this order on the substrate.

3. The radiographic image detector according to claim 2, wherein the optical coupling layer includes a thermosetting resin.

4. The radiographic image detector according to claim 2, wherein the optical coupling layer is a hot melt sheet.

5. The radiographic image detector according to claim 2, wherein the optical coupling layer includes a pressure sensitive adhesive material.

6. The radiographic image detector according to claim 1, wherein the scintillator layer is formed from a phosphor raw material having a total impurity content of 2.5 ppm to 35 ppm, the total impurity content being the content of an impurity or impurities, except an activator, having a higher melting point than the phosphor raw material.

7. The radiographic image detector according to claim 6, wherein the phosphor raw material is cesium iodide, and
the impurity or impurities include one or more elements selected from magnesium, calcium, strontium, barium, aluminum, silicon, nickel, copper, iron, manganese, chromium, molybdenum and tantalum.

8. The radiographic image detector according to claim 7, wherein the optical coupling layer includes a thermosetting resin.

9. The radiographic image detector according to claim 7, wherein the optical coupling layer is a hot melt sheet.

10. The radiographic image detector according to claim 7, wherein the optical coupling layer includes a pressure sensitive adhesive material.

11. The radiographic image detector according to claim 6, wherein the optical coupling layer includes a thermosetting resin.

12. The radiographic image detector according to claim 6, wherein the optical coupling layer is a hot melt sheet.

13. The radiographic image detector according to claim 6, wherein the optical coupling layer includes a pressure sensitive adhesive material.

* * * * *